United States Patent
Baba et al.

(10) Patent No.: US 8,924,761 B2
(45) Date of Patent: Dec. 30, 2014

(54) DATA PROCESSOR AND DATA PROCESSING SYSTEM

(75) Inventors: Sei Baba, Kanagawa (JP); Takeshi Shimanuki, Nanae (JP); Eiji Kimura, Nanae (JP)

(73) Assignee: Renesas Electronics Corporation, Kawasaki-shi (JP)

(*) Notice: Subject to any disclaimer, the term of this patent is extended or adjusted under 35 U.S.C. 154(b) by 929 days.

(21) Appl. No.: 13/088,155

(22) Filed: Apr. 15, 2011

(65) Prior Publication Data

US 2011/0258428 A1    Oct. 20, 2011

(30) Foreign Application Priority Data

Apr. 16, 2010   (JP) .................................. 2010-094648
Mar. 22, 2011   (JP) .................................. 2011-062141

(51) Int. Cl.
G06F 1/00    (2006.01)
G06F 1/24    (2006.01)

(52) U.S. Cl.
CPC ......................................... *G06F 1/24* (2013.01)
USPC ......................................... 713/330; 713/340

(58) Field of Classification Search
None
See application file for complete search history.

(56) References Cited

U.S. PATENT DOCUMENTS

| | | | |
|---|---|---|---|
| 2007/0046342 A1* | 3/2007 | Morino et al. | 327/143 |
| 2008/0040562 A1* | 2/2008 | Gower et al. | 711/154 |
| 2008/0079467 A1* | 4/2008 | Hou | 327/143 |
| 2008/0218224 A1* | 9/2008 | Morino et al. | 327/143 |
| 2010/0088503 A1* | 4/2010 | Eto | 713/100 |

FOREIGN PATENT DOCUMENTS

JP    10-312227 A    11/1998

* cited by examiner

*Primary Examiner* — Kim Huynh
*Assistant Examiner* — Vincent Chang
(74) *Attorney, Agent, or Firm* — Miles & Stockbridge P.C.

(57) ABSTRACT

A reset controller is adopted which performs control for causing an external reset terminal to be shared for external output of a reset signal and input of a reset signal from outside, allowing a reset input from the external reset terminal in a state in which a power supply voltage is stable, and causing, when a reset factor due to turn-on of a power supply voltage or a reduction in the level of the power supply voltage is detected by a detection circuit, an input/output buffer to output a reset signal to the external reset terminal and masking the inflow of the reset signal from the input/output buffer to its input path, using a signal detected by the detection circuit. A mask period is assumed to be a period longer than a period from reset instructions to a reset release.

18 Claims, 8 Drawing Sheets

| RESET CONTROL REGISTER SETTING DATA | | SYSTEM RESET (INTERNAL RESET) | EXTERNAL RESET OUTPUT |
|---|---|---|---|
| SRD1 | GENERATE VIRTUAL DETECTION SIGNAL S20 SOFTWARE RESET A | ○ | ○ |
| SRD2 | GENERATE SOFTWARE SYSTEM RESET REQUEST SIGNAL S21 SOFTWARE RESET B | ○ | × |
| SRD3 | GENERATE SOFTWARE EXTERNAL RESET SIGNAL S22 SOFTWARE RESET C | × | ○ | ary

DATA PROCESSOR AND DATA PROCESSING SYSTEM

CROSS-REFERENCE TO RELATED APPLICATIONS

The present application claims priority from Japanese patent applications JP 2010-094648 filed on Apr. 16, 2010, and JP2011-062141 filed on Mar. 22, 2011 the contents of which are hereby incorporated by reference into this application.

BACKGROUND

The present invention relates to a reset control technology of a data processor, and in particular to a technology for sharing one external reset terminal for the input and output of a reset signal, e.g., a technology effective if applied to a keyboard of a PC (personal computer) and a power-supply control microcomputer thereof.

A power-on/low voltage detection circuit (POR/LVD detection circuit) that detects the turn-on of a power supply voltage and a reduction in the level of the power supply voltage as reset factors respectively is on-chipped to a data processor. Consequently, the data processor is capable of performing initialization autonomously with respect to the turn-on of the power supply voltage and the reduction in the level of the power supply voltage without depending on a reset IC for achieving a similar function at the outside. Each of reset signals generated by other on-chip circuits starting with the POR/LVD detection circuit is outputted from its corresponding external terminal, whereby it can be used as a reset signal for initializing each of other LSIs.

The following patent document 1 has described that a microcomputer (micon IC) is used as a high-functionality reset IC. That is, the micon IC has a reset control means and is provided with the function of detecting on/off of a power supply circuit of a CPU target for control, performing a reset operation on the CPU, based on a command issued from the CPU when the power supply circuit is in an on state, bringing the power supply circuit of the CPU to an on state when the power supply circuit is in an off state and then resetting the CPU automatically.

[Patent document 1] Japanese Unexamined Patent Publication No. Hei 10 (1998)-312227

SUMMARY

The patent document 1 has described that the microcomputer is used as the reset IC. According to its description, however, the micon IC needs a power & reset switch as a reset input and has an output terminal for a power & reset signal as a reset output. Accordingly, the micon IC should have the input and output terminals for the reset signal individually.

When the micon IC has the terminal for outputting the reset signal generated by the POR/LVD detection circuit to the outside and the terminal for inputting the reset signal from the outside individually, the following problems are considered to arise. The reset input terminal is useless for a data processing system in which the reset signal generated by the POR/LVD detection circuit is used with output to the outside, because it becomes an unused terminal. The reset output terminal is useless for a data processing system using an external reset IC in reverse because it becomes an unused terminal.

Further, according to the studies of the present inventors, it has been revealed that the following problems arise where an attempt is made to output the reset signal generated by the POR/LVD detection circuit to the outside while making allowance for the sharing of the input terminal for the external reset signal. That is, it has been found that there is a fear that when the reset signal generated by the POR/LVD detection circuit is outputted from the external reset terminal shared for the reset input, the reset signal propagates into a reset signal input path via a buffer circuit coupled to the shared terminal and becomes indistinguishable from the external reset signal supplied from outside, so that a process that responds to the input of a new external reset signal is interrupted to initialize the previous process of generating the reset signal by the POR/LVD detection circuit in mid course, whereby the reset signal outputted to the outside is brought to the same state as when placed in its reset release without waiting for the elapse of a required reset hold time. When the reset signal outputted to the outside is reset-released without waiting for the elapse of the required reset hold time, the inside of a device receiving the reset signal therein does not reach a stable initial state and a power supply voltage does not reach an operation guarantee voltage, thereby causing the occurrence of a runaway in a device such as a processor that configures a system, and the occurrence of a malfunction in the entire system.

An object of the present invention is to provide a data processor capable of outputting a reset signal generated by a POR/LVD detection circuit from the same external terminal as the input of an external reset signal and suppressing the inflow of the reset signal outputted to the outside into an input system of a reset signal from the outside.

Another object of the present invention is to provide a data processing system capable of contributing to suppression of a runaway of the system and its miniaturization while maintaining the reliability of a reset function assuming, as factors, a power-on reset and a reduction in the level of a power supply voltage with respect to the entire system based on a data processor equipped with the function of a power supply IC.

The above, other objects and novel features of the present invention will become apparent from the description of the present specification and the accompanying drawings.

A summary of a typical one of the invention disclosed in the present application will be explained in brief as follows:

A reset controller is adopted which performs control for causing an external reset terminal to be shared for external output of a reset signal and input of a reset signal from outside, allowing a reset input from the external reset terminal in a state in which a power supply voltage is stable, causing, when reset factors to turn-on of a power supply voltage and a reduction in the level of the power supply voltage are detected by a detection circuit for detecting the reset factors, an input/output buffer to output a reset signal to the external reset terminal and masking the inflow of the reset signal from the input/output buffer to its input path, using its detected signal. The mask is done earlier than the output of the reset signal to the outside. A mask period is assumed to be a period longer than a period from reset instructions to a reset release.

This can thus contribute to a reduction in the number of external terminals of a data processor and suppress the inflow of a reset signal outputted to the outside into an input system of a reset signal from the outside. It is therefore possible to prevent in advance the occurrence of a situation that reset instructions to the outside based on the result of detection by a POR/LVD detection circuit are released at an untimely timing due to the signal inflowed into the input system. A runaway and a malfunction of a circuit that receives the reset signal at the outside can be avoided. The data processor can achieve the function of a power supply IC and contributes to a reduction in the area of a mounting circuit board that configures a data processing system with being equipped with a device such as the data processor.

Advantageous effects obtained by a typical one of the invention disclosed in the present application will be briefly explained as follows:

A data processor according to the present invention is capable of outputting a reset signal generated by a POR/LVD detection circuit from the same external terminal as for the input of an external reset signal and suppressing the inflow of the reset signal outputted to the outside into an input system of the reset signal given from the outside. It is possible to maintain the reliability of a reset function assuming, as factors, a power-on reset and a reduction in the level of a power supply voltage with respect to the entire system based on the data processor equipped with a function as a power supply IC. This can therefore contribute to the suppression of a runaway of the data processing system equipped with the data processor along with its miniaturization.

DETAILED DESCRIPTION

1. Summary of the Embodiments

A summary of typical embodiments of the invention disclosed in the present application will first be explained. Reference numerals of the accompanying drawings referred to with parentheses in the description of the summary of the typical embodiments only illustrate elements included in the concept of components to which the reference numerals are given.

[1] <Input Rule at Output Operation of Reset Terminal Shared for Input/Output>

A data processor (1) according to a typical embodiment of the present invention includes an external reset terminal (RESION) shared for external output of a reset signal and input of a reset signal from outside, an input/output buffer (4) coupled to the external reset terminal, and a detection circuit (3) which detects respective reset factors to turn-on of a power supply voltage and a reduction in the level of the power supply voltage, and generates a system reset signal, based on a detection signal from the detection circuit (POR/LVD detection circuit) and an input from the input/output buffer. Further, the data processor (1) includes a reset controller (10) which when a system reset signal (S9) generated based on the detection signal (S1) from the detection circuit is supplied to the outside through the external reset terminal, performs control for selecting an output operation of the input/output buffer and masking the input from the input/output buffer during a period which contains a period from reset instructions given to the outside to a reset release given thereto and is longer than this period, and internal circuit modules (40 to 43) each initialized based on the system reset signal.

Thus, it contributes to a reduction in the number of external terminals of the data processor. The inflow of a reset signal outputted to the outside into an input system of a reset signal from the outside can be suppressed. It is therefore possible to prevent in advance the occurrence of a situation that reset instructions to the outside based on the result of detection by a POR/LVD detection circuit are released at an untimely timing by the signal inflowed into the input system. A runaway and a malfunction of a circuit that receives the reset signal at the outside can be avoided. The data processor can achieve the function of a power supply IC and contribute to a reduction in the area of a mounting circuit board that configures a data processing system with being equipped with a device such as the data processor. The data processor is suitable for the field of a mobile device starting with a note PC that needs to meet a high demand for a reduction in the mounting area of a device.

[2] <Modes of Control Every Reset Factor with Respect to Turn-on of Power Supply Voltage and Reduction in the Level Thereof>

In the data processor described in the paragraph [1], the reset controller unselects the output operation of the input/output buffer and releases the input mask from the input/output buffer at a timing delayed from the reset release given to the outside in wait for an elapse of a reset hold period when the reset factor due to the turn-on of the power supply voltage is detected, generates a system reset signal synchronized with a change in the reset signal inputted from the external reset terminal during a period of non-detection of the reset factor after the release of reset instructions based on the reset factor due to the turn-on of the power supply voltage. Further, the reset controller performs control for selecting the input mask from the input/output buffer and the output operation of the input/output buffer when the reset factor due to the reduction in the level of the power supply voltage after a release of the reset instructions based on the reset factor due to the turn-on of the power supply voltage is detected and then giving reset instructions to the outside from the external reset terminal, and for unselecting the output operation of the input/output buffer and releasing the input mask from the input/output buffer after the reset release has been given to the outside in wait for an elapse of a reset hold period.

When the reset factors due to the turn-on of the power supply voltage and the reduction in the level thereof are detected, and the power supply voltage is in a stable state, reset control can be easily performed in just proportion.

[3] <Relationship with System Reset Signal>

In the data processor described in the paragraph [1] or [2], the reset controller generates reset instructions given to the outside from the external reset terminal at a timing delayed from the reset instructions by the system reset signal, and generates instructions for the reset release given to the outside from the external reset terminal at the same timing as instructions for a reset release by the system reset signal.

Buffer control and mask control can be synchronized with each other from the relationship between the system reset signal and the reset signal outputted from the external reset terminal.

[4] <Selection of Dedication to Reset Input/Sharing for Input/Output by Each Operation Mode>

The data processor described in any of the paragraphs [1] through [3] further includes mode terminals (MD1, MD2 and P90 through P92). When a first operation mode is instructed from the corresponding mode terminal, the reset controller shares the external reset terminal for the external output of the reset signal and the input of the reset signal from outside. When a second operation mode is instructed from the corresponding mode terminal, the reset controller uses the external reset terminal specifically for the input of the reset signal from outside.

The external reset terminal can be made available for a usage form for only the external input.

[5] <Configuration of Reset Controller>

In the data processor described in any of the paragraphs [1] through [4], the reset controller includes a first control circuit (11) which activates a first signal (S2) in response to the detection (S1) of the reset factor from the detection circuit and sets a timing provided to inactivate the first signal as a reset release timing, a mask gate circuit (14) which selectively masks an activated second signal (S11) inputted from the input/output buffer, and a second control circuit (15) which initializes the first control circuit in response to the activation of the second signal from the mask gate circuit and transfers the activated second signal to a subsequent stage as an external reset instruction signal. Further, the reset controller includes a first signal generator (17, 31) which generates a system reset signal (S9), based on the first signal, the second signal transferred via the second control circuit and signals related to other reset factors. A mask control signal (S6) for masking the mask gate circuit in response to the activation of the first signal and releasing the mask of the mask gate circuit by responding to the inactivation of the first signal with a delay is generated. Further, the reset controller includes a second signal generator (18, 19) which generates a buffer control signal (S8) for selecting the output operation of the input/output buffer during a mask period by the mask control signal, gives reset instructions by the system reset signal as an output signal of the input/output buffer by responding to a mask setting based on the mask control signal with a delay, and performs a mask release of the mask control signal after a reset release by the system reset signal has been given as the output signal of the input/output buffer.

The reset controller can easily be achieved.

[6] <Selection of Dedication To Reset Input/Sharing for Input/Output by Each Operation Mode>

The data processor described in the paragraph [5] further includes mode terminals (MD1, MD2, P90 through P92). When a first operation mode is instructed from the corresponding mode terminal, the second signal generator shares the external reset terminal for the external output of the reset signal and the input of the reset signal from outside. When a second operation mode is instructed from the corresponding mode terminal, the second signal generator uses the external reset terminal specifically for the input of the reset signal from outside.

The external reset terminal can be made available for a usage form for only the external input.

[7] <Test Control Register>

The data processor described in the paragraph [5] or [6] further includes a test control register (35) which generates a test signal (S10) virtually assumed to be the first signal for the second signal generator.

Upon a device test on an external output operation of a reset signal at the data processor, respective reset factors to the turn-on of a power supply voltage and a reduction in the level of the power supply voltage can be generated on a pseudo basis efficiently at arbitrary timings by rewriting of the test control register without spending a voltage transition time taken when the power supply voltage is actually turned on to be stabilized or reduced in level. This can therefore contribute to the shortening of a test time and a reduction in test cost.

[8] <Data Processing System>

A data processing system according to another embodiment of the present invention includes a data processor (1) which controls input/output devices (240 through 244 and 248) coupled to the outside, input/output controller hubs (201, 205) coupled to the data processor, and a main processor (200) coupled to the input/output controller hubs by a system bus. The data processor includes an external reset terminal (RESION) shared for external output of a reset signal and input of a reset signal from outside, an input/output buffer (4) coupled to the external reset terminal, and a detection circuit (3) which detects respective reset factors to turn-on of a power supply voltage (VCC) and a reduction in the level of the power supply voltage. A system reset signal (S9) is generated based on a detection signal from the detection circuit and an input from the input/output buffer. Further, the data processor includes a reset controller (10), which when the system reset signal generated based on the detection signal from the detection circuit is supplied to the outside through the external reset terminal, performs control for selecting an output operation of the input/output buffer and masking the input from the input/output buffer during a period which contains a period from reset instructions given to the outside to a reset release given thereto and is longer than this period, and internal circuit modules (40 through 43) each initialized based on the system reset signal.

As with the paragraph [1], a reset signal generated by a POR/LVD detection circuit can be shared with an input terminal for an external reset signal and outputted to the outside, and the inflow of the reset signal outputted to the outside into an input system of the reset signal from outside via an input buffer can be suppressed. Further, the data processor is able to realize the function of a power supply IC and contribute to a reduction in the area of a circuit board that configures the data processing system.

[9] <Reset of Each Input/Output Device by Data Processor>

In the data processing system described in the paragraph [8], each of the input/output devices is initialized by inputting the reset signal outputted from the external reset terminal of the data processor.

The function of initialization of each input/output device by the function of a power supply IC made unnecessary in terms of the system can be achieved by the data processor.

[10] <Reset Instructions of High-Order Hierarchy>

In the data processing system described in the paragraph [8] or [9], the data processor outputs a signal generated based on the system reset signal to the input/output controller hubs as a reset signal.

A POR/LVD detecting function of the data processor can be diverted even for initialization relative to the input/output controller hubs and the high-order hierarchy.

[11] <LPC Bus>

In the data processing system described in any of the paragraphs [8] through [10], the input/output devices and the input/output controller hubs are coupled to the data processor via an LPC bus.

The data processing system according to the present embodiment can be applied even to such a PC that an LPC bus used in low-band device coupling is adopted.

[12] <Modes of Control Every Reset Factor Due to Turn-on of Power Supply Voltage and a Reduction in the Level Thereof>

In the data processing system described in any of the paragraphs [8] through [11], the reset controller unselects the output operation of the input/output buffer and releases the input mask from the input/output buffer at a timing delayed from the reset release given to the outside in wait for an elapse of a reset hold period when the reset factor due to the turn-on of the power supply voltage is detected. Further, the reset controller generates a system reset signal synchronized with a change in the reset signal inputted from the external reset terminal during a period of non-detection of the reset factor after the release of reset instructions based on the reset factor due to the turn-on of the power supply voltage, selects the input mask from the input/output buffer and the output operation of the input/output buffer when the reset factor due to the reduction in the level of the power supply voltage after a release of the reset instructions based on the reset factor due to the turn-on of the power supply voltage is detected and then gives reset instructions to the outside from the external reset terminal. Furthermore, the reset controller performs control for unselecting the output operation of the input/output buffer and releasing the input mask from the input/output buffer after the reset release has been given to the outside in wait for an elapse of a reset hold period.

When the reset factors due to the turn-on of the power supply voltage and the reduction in the level thereof are detected, and the power supply voltage is in a stable state, reset control can be easily conducted in just proportion.

[13] <Relationship with System Reset Signal>

In the data processing system described in any of the paragraphs [8] through [12], the reset controller generates reset instructions given to the outside from the external reset terminal at a timing delayed from the reset instructions by the system reset signal, and generates instructions for the reset release given to the outside from the external reset terminal at the same timing as instructions for a reset release by the system reset signal.

Buffer control and mask control can be synchronized with each other from the relationship between the system reset signal and the reset signal outputted from the external reset terminal.

[14] <Configuration of Reset Controller>

In the data processing system described in any of the paragraphs [8] through [13], the reset controller includes a first control circuit (11) which activates a first signal (S2) in response to the detection (S1) of the reset factor from the detection circuit and sets a timing provided to inactivate the first signal as a reset release timing, a mask gate circuit (14) which selectively masks an activated second signal (S11) inputted from the input/output buffer, and a second control circuit (15) which initializes the first control circuit in response to the activation of the second signal from the mask gate circuit and transfers the activated second signal to a subsequent stage as an external reset instruction signal. Further, the reset controller includes a first signal generator (17, 31) which generates a system reset signal (S9), based on the first signal, the second signal transferred via the second control circuit and signals related to other reset factors. A mask control signal (S6) for masking the mask gate circuit in response to the activation of the first signal and releasing the mask of the mask gate circuit by responding to the inactivation of the first signal with a delay is generated. Furthermore, the reset controller includes a second signal generator (18, 19) which generates a buffer control signal (S8) for selecting the output operation of the input/output buffer during a mask period by the mask control signal, gives rest instructions by the system reset signal as an output signal of the input/output buffer by responding to a mask setting based on the mask control signal with a delay, and performs a mask release of the mask control signal after a reset release by the system reset signal has been given as the output signal of the input/output buffer.

The reset controller can easily be achieved.

[15] <Selection of Dedication to Reset Input/Sharing for Input/Output by Each Operation Mode>

The data processing system described in the paragraph [14] further includes mode terminals. When a first operation mode is instructed from the corresponding mode terminal, the second signal generator shares the external reset terminal for the external output of the reset signal and the input of the reset signal from outside. When a second operation mode is instructed from the corresponding mode terminal, the second signal generator uses the external reset terminal specifically for the input of the reset signal from outside.

The external reset terminal can be made available for a usage form for only the external input.

[16] <Software Reset A>

In the data processor described in the paragraph [1], the reset controller includes a software reset control register accessible by the internal circuits. When first data is written into the software reset control register, the reset controller generates a virtual detection signal equivalent to the detection signal from the detection circuit to thereby generate the system reset signal and give reset instructions to the outside through the external reset terminal and to select an output operation of the input/output buffer and mask the input from the input/output buffer during a period which contains a period from reset instructions given to the outside to a reset release given thereto and is longer than this period.

A system reset and reset control equivalent to an external reset control function, caused by the detection signal from the detection circuit can be carried out by a write operation to the software reset control register. Accordingly, a system reset and external reset control similar to the case where an undesired reduction in power supply voltage occurs with respect to abnormal detection of an undesired rise in temperature or the like, can be easily achieved using software.

[17] <Software Reset B>

In the data processor described in the paragraph [1], the reset controller includes a software reset control register accessible by the internal circuits. When second data is written into the software reset control register, the reset controller generates a software system reset request signal to thereby change the system reset signal from the reset instructions to the reset release.

The system reset can be arbitrarily performed using software.

[18] <Software Reset C>

In the data processor described in the paragraph [1], the reset controller includes a software reset control register accessible by the internal circuits. When third data is written into the software reset control register, the reset controller generates a software external reset request signal to thereby give reset instructions to the outside through the external reset terminal and to select an output operation of the input/output buffer and mask the input from the input/output buffer during a period which contains a period from reset instructions given to the outside to a reset release given thereto and is longer than this period.

Only reset control equivalent to an external reset control function due to the detection signal from the detection circuit can be easily realized using software.

2. Further Detailed Description of the Embodiments

Embodiments will further be described in detail.

First Embodiment

Figure 3:
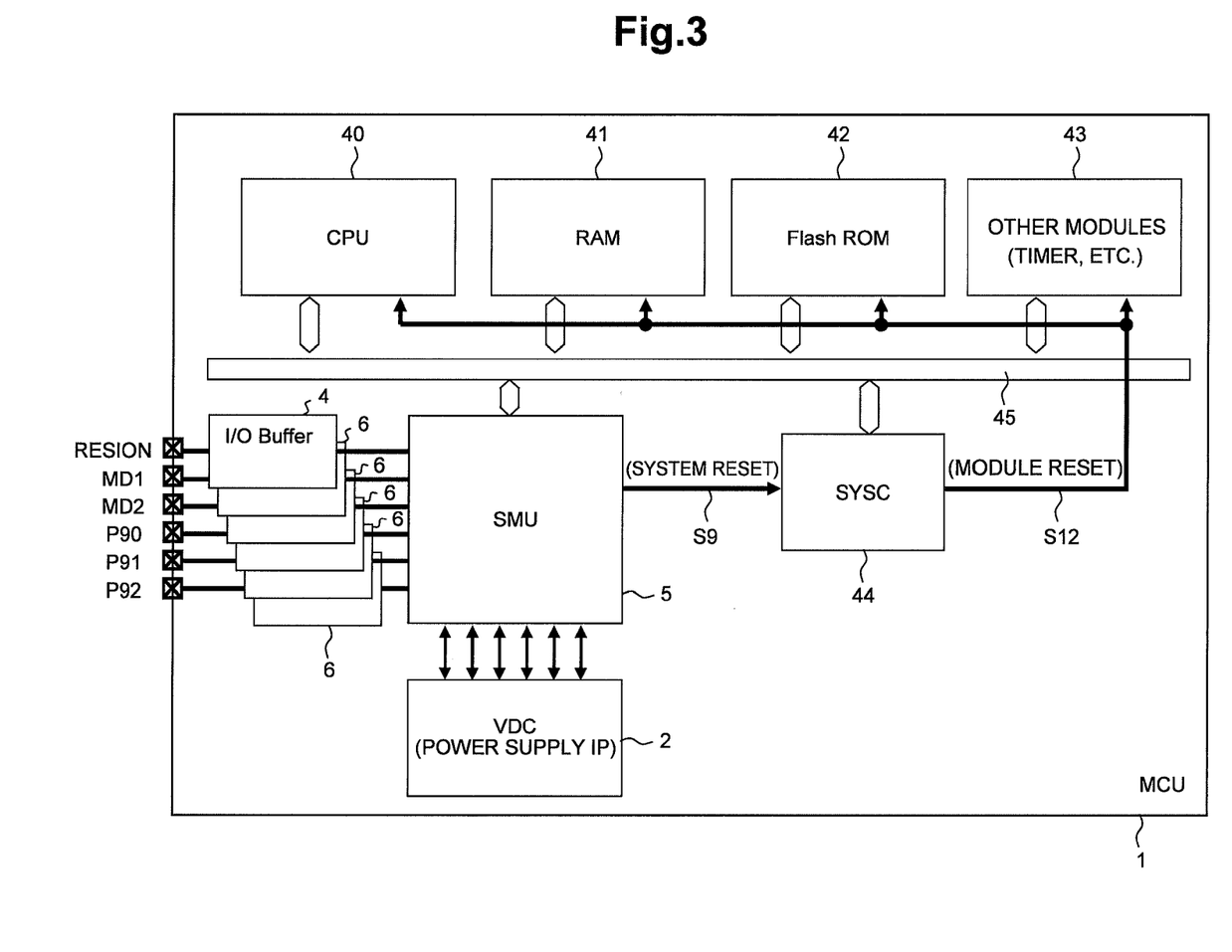
FIG. 3 illustrates a schematic configuration of the data processor according to the first embodiment of the present invention.

A schematic configuration of a data processor according to a first embodiment of the present invention is illustrated by an example in FIG. 3. Although not limited in particular, the data processor 1 is formed in a single semiconductor substrate like monocrystalline silicon or the like, using a complementary MOS integrated circuit manufacturing technology or the like.

The data processor 1 has a central processing unit (CPU) 40 which fetches and executes an instruction, a RAM 41 used in a work region or the like of the CPU 40, an electrically reprogrammable non-volatile memory (FLASH) 42 in which programs to be executed by the CPU 40 and control data or the like are stored, and a plurality of peripheral modules 43 such as a timer, etc. They are coupled to an internal bus 45. A system management unit (SMU) 5 performs control on operation modes of the data processor 1 and its reset control. An external reset terminal RESION is coupled to the system management unit 5 via an input/output buffer 4. Mode terminals MD1, MD2, P90, P91 and P92 are respectively coupled to the system management unit 5 via input/output buffers 6. The system management unit 5 generates a system reset signal S9 according to the application of a power supply voltage to a power supply circuit 2 and the state of the power supply voltage, further, the state of the external reset terminal RESION, the state of each internal circuit module, and the like, and supplies it to a system controller (SYSC) 44. The system controller 44 generates a module reset signal S12, based on the system reset signal S9 and supplies it to circuit modules 40 through 43 and so on.

Figure 1:
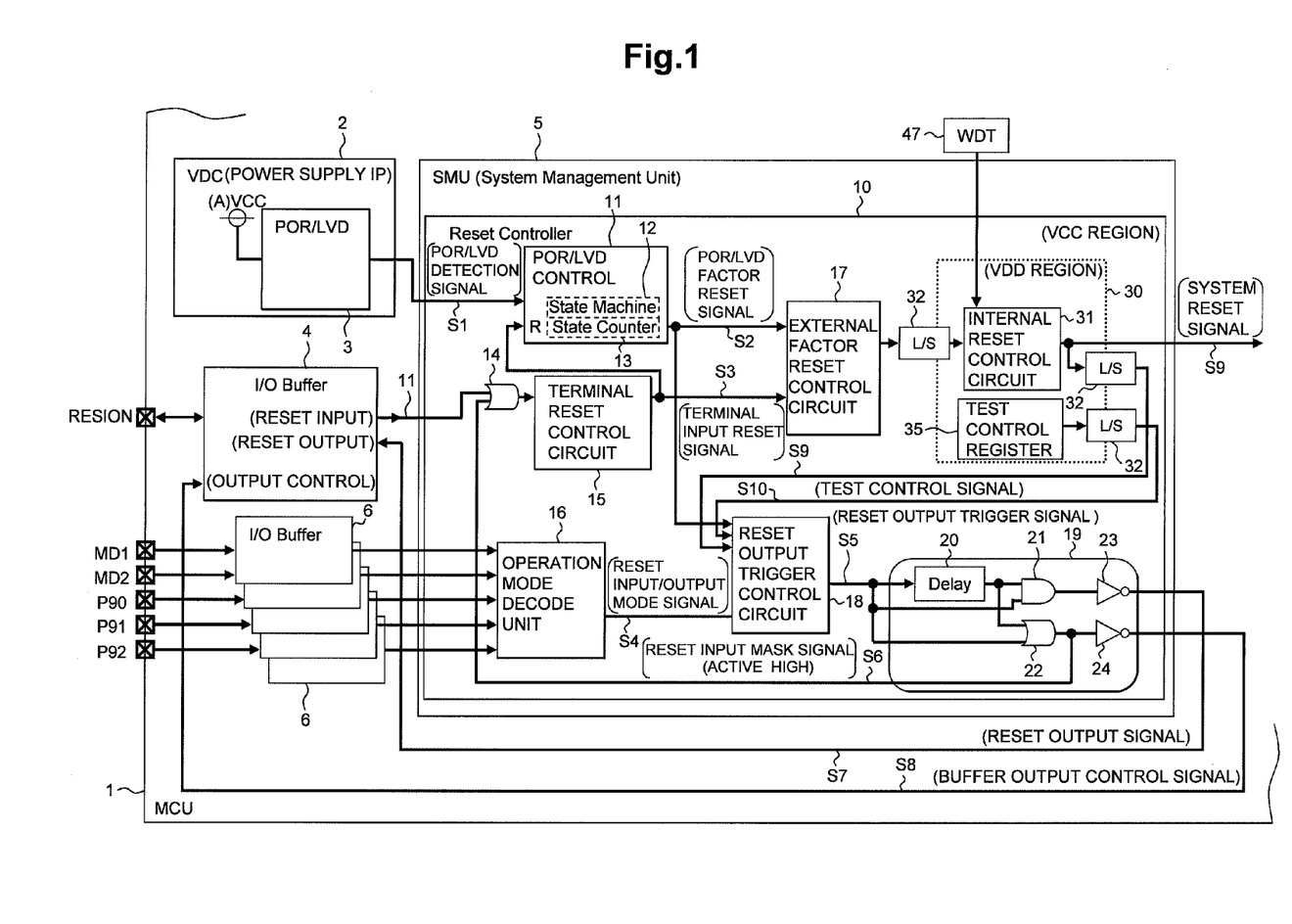
FIG. 1 is a block diagram showing a concrete example of a reset controller provided in a data processor according to a first embodiment of the present invention.

A concrete example of the system management unit 5 is shown in FIG. 1.

The external reset terminal RESION is a terminal shared for the output of a reset signal to the outside the input thereof from the outside. Although not illustrated in particular, the input/output buffer 4 has a tristate output buffer and an input buffer. An input terminal of the input buffer is coupled to an output terminal of the tristate output buffer, and the external reset terminal RESION is coupled to a coupling node thereof. A signal S8 is supplied to a tristate control terminal of the tristate output buffer. The tristate output buffer is capable of output operation according to the low level of the signal S8 and is brought to a high output impedance state according to the high level of the signal S8.

The power supply circuit 2 has a detection circuit (POR/LVD detection circuit) 3 which detects reset factors to the turn-on of a power supply voltage VCC and a reduction in the level of the power supply voltage VCC. The POR/LVD detection circuit 3 detects whether the power supply voltage VCC reaches a prescribed level (POR/LVD detection level). If the power supply voltage VCC is found not to reach the prescribed level, then the POR/LVD detection circuit 3 brings a POR/LVD detection signal S1 to a low level. If the power supply voltage VCC is found to reach the prescribed level, then the POR/LVD detection circuit 3 brings the POR/LVD detection signal S1 to a high level.

The system management unit 5 generates a system reset signal S9, based on the POR/LVD detection signal S1 outputted from the POR/LVD detection circuit 3 and a signal S11 inputted from the input/output buffer 4 and performs output control on the input/output buffer 4, based on the control signal S8. Further, the system management unit 5 has a reset controller 10 which generates a reset signal S7 to be supplied to the outside from the external reset terminal RESION via the input/output buffer 4, based on the detection of the reset factors by the POR/LVD detection circuit 3. In particular, the reset controller 10 performs control for selecting an output operation of the input/output buffer 4 and masking the input from the input/output buffer 4 during a period which contains a period from the instructions for reset by the reset signal S7 supplied from outside and is longer than this period. This control will next be explained in detail.

The reset controller 10 has a mask circuit 14 comprised of an OR gate which inputs the input given from the input/output buffer 4 and a mask signal S6 therein and masks the input from the input/output buffer 4 according to a high level of the mask signal S6, a terminal reset control circuit 15 which outputs a terminal input reset signal S3 in which a timing adjustment has been made to the output signal of the mask circuit 14, and a POR/LVD control circuit 11 which inputs the POR/LVD detection signal S1 therein and outputs a POR/LVD factor reset signal S2 therefrom. The POR/LVD control circuit 11 includes a state machine 12 which performs state transition control for generating the POR/LVD factor reset signal S2, and a state counter 13 which performs a count operation for prescribing a reset hold period or the like. The POR/LVD control circuit 11 sets the POR/LVD factor reset signal S2 to a low level according to the low level of the POR/LVD detection signal S1, starts counting of the reset hold period by the state counter 13 depending on a change from the low level of the POR/LVD detection signal S1 to its high level, and inverts the POR/LVD factor reset signal S2 from a low level to a high level in sync with a countout (elapse of reset hold period) of its counting.

On the other hand, when the input of the terminal reset control circuit 15 is rendered low in level, the terminal input reset signal S3 is brought to a low level. When the input of the terminal reset control circuit 15 is rendered high in level, the terminal input reset signal S3 is brought to a high level.

An external factor reset control circuit 17 makes effective a change in either the signal S2 or S3 according to the AND of the signals S2 and S3 and transfers the so-processed signal to a subsequent stage. The signal transmitted to the subsequent stage is supplied to the system controller SYSC 44 as a system reset signal S9 via an internal reset control circuit 31 that receives therein an internal reset request signal outputted from each of other circuit modules such as a watchdog timer (WDT) 47. The internal reset control circuit 31 performs priority control on various reset requests and assigns top priority to the reset request issued from the external factor reset control circuit 17. Incidentally, the reset controller 10 is almost placed in a VCC region operated at the power supply voltage VCC, but the internal reset control circuit 31 is configured by a circuit having a VDD region in which an internal power supply voltage VDD is used as an operating power supply. Therefore, the transfer of signals between both regions is via a level shifter 32.

The signal S3 is supplied to a reset terminal R of the POR/LVD control circuit 11. Thus, the POR/LVD control circuit 11 is initialized by the input of the low level to the reset terminal R so that the POR/LVD factor reset signal S2 is rendered high in level. When sequence processing of the POR/LVD control circuit 11 is initialized even while the low level signal S2 is being outputted by the POR/LVD control circuit 11, the POR/LVD factor reset signal S2 is brought to the high level, but the signal S3 is low in level. For this reason, no influence is exerted on the output of the low level by the external factor reset control circuit 17, i.e., the output of a low level of the system reset signal S9. In brief, when external reset processing from the external terminal RESION is designated during the process of reset by the POR/LVD control circuit 11, a high priority is placed on the external reset instructions and the timing provided to release the reset of the system reset signal S9 is determined by an external reset signal.

The system reset signal S9 and the POR/LVD factor reset signal S2 are supplied to a reset output trigger control circuit 18. When a reset input/output mode is selected by a reset input/output mode signal S4, the reset output trigger control circuit 18 outputs an inverse level of the system reset signal S9 as a reset output trigger signal S5 on condition that the POR/LVD factor reset signal S2 is at the low level (indicative of reset instructions due to a reset factor based on the POR/LVD detection). When the POR/LVD factor reset signal S2 is rendered high in level, the reset output trigger signal S5 is fixed to a low level. Even when a reset input-dedicated mode is instructed by the reset input/output mode signal S4, the reset output trigger signal S5 is fixed to the low level. Incidentally, the reset input/output mode signal S4 is generated by allowing an operation mode decode unit 16 to determine the state of an input from each of the mode terminals MD1, MD2 and P90 through P92.

A reset output control circuit 19 is a circuit which inputs the trigger signal S5 therein and thereby generates a reset input mask signal S6, a reset output signal S7 and a buffer output control signal S8. The reset output control circuit 19 has a delay 20, an AND gate 21, an OR gate 22 and inverters 23 and 24. The reset output control circuit 19 disables the output operation of the input/output buffer 4 by the control signal S8 (high level) in the stable state of the power supply voltage (high level of signal S2) and eliminates the mask by the signal S6 (low level), thereby allowing a reset input from the external reset terminal RESION. Further, when a reset factor is detected by the POR/LVD detection circuit 3 for detecting the reset factors to the turn-on of the power supply voltage VCC and the reduction in the level of the power supply voltage VCC, the reset output control circuit 19 performs control for enabling the output operation of the input/output buffer 4 by the signal S8, using a change (low level) in the signal S2 based on its detected signal S1 to thereby output the reset signal S7 to the external reset terminal RESION, and for masking the inflow of the reset signal S7 from the input/output buffer 4 to the terminal reset control circuit 15 by the signal S6 (high level). Under the control of the reset output control circuit 19, the mask to be done by the high level of the signal S6 is performed earlier than the output of the reset signal S7 to the outside, and its mask period is assumed to be a period longer than a period from the reset instructions by the reset signal S7 to its release.

A test control register 35 shown in FIG. 1 is a control register which generates a test signal S10 assumed to be virtually the POR/LVD factor reset signal S2 for the reset trigger control circuit 18. The test control register 35 is capable of arbitrarily setting the level of the signal S10 by access of the CPU 40. Upon a device test on the external output operation of the reset signal at the data processor 1, the respective reset factors due to the turn-on of the power supply voltage and the reduction in the level of the power supply voltage can be generated on a pseudo basis efficiently at arbitrary timings by rewriting of the test control register 35 without spending a voltage transition time taken when the power supply voltage VCC is actually turned on to be stabilized or reduced in level. This can therefore contribute to the shortening of a test time and a reduction in test cost.

Figure 2:
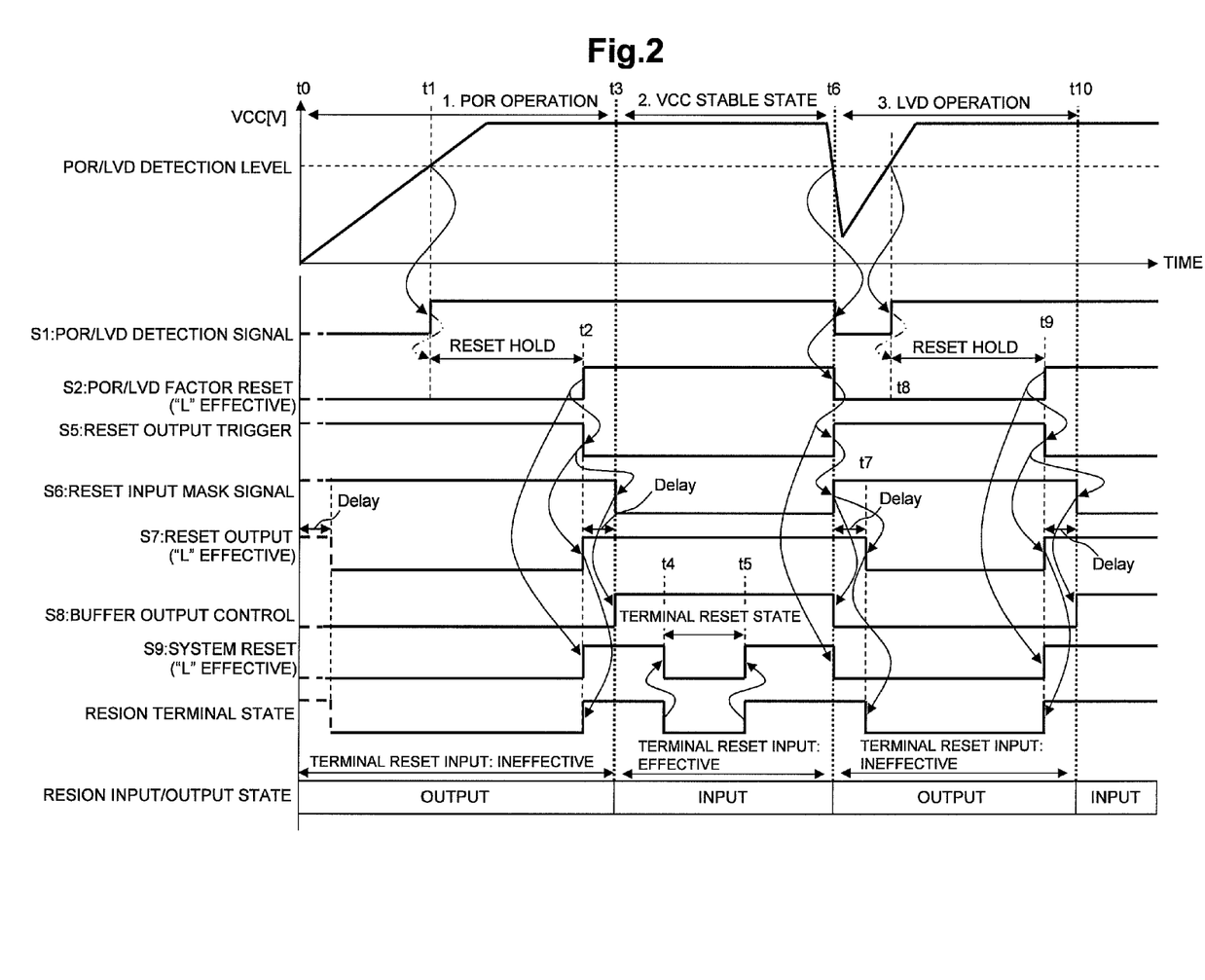
FIG. 2 is a timing chart illustrating the operation of generating a reset signal by the reset controller.

FIG. 2 is a timing chart showing the operation of generating a reset signal by the reset controller.

When the operating power supply VCC is turned on at a time t0 and reaches a POR/LVD detection level at a time t1, the POR/LVD detection signal S1 is changed to a high level. Thus, the operation of the POR/LVD control circuit 11 is started so that the POR/LVD factor reset signal S2 is changed to a high level after a reset hold period (time t2). During this period, the signal S6 is brought to a high level to perform an input mask at the mask circuit 14, the signal S8 is brought to a low level to enable the output of the input/output buffer 4, and the signal S7 is brought to a low level to instruct the reset to the outside from the external terminal RESION. Since, at the time t2, the signals S5, S7 and S9 are level-inverted, but the levels of the signals S6 and S8 are maintained, the input mask is maintained up to a timing (time t3) after the reset instructions to the outside from the external terminal RESION, and the low level of the signal S7 inflows into the terminal reset control circuit 15 until the reset instructions to the outside are normally released by the signal S7, whereby the POR/LVD control circuit 11 is undesirably initialized in mid course so that the signal S2 is initialized to a high level. As a result, the signal S7 is suppressed from being inverted to a high level at a fast timing. Accordingly, the reset of a device operated in response to the reset signal supplied to the outside from the external terminal RESION is properly conducted, thereby making it possible to prevent a malfunction and a runaway of an external system after power-on reset before happen.

Since the signal S8 is rendered high in level at a time t3 or subsequently, the output operation of the input/output buffer 4 is disabled so that the external reset input from the external terminal RESION is enabled. At a time t4, the system reset signal S9 is brought to a low level by the reset instructions given from the outside, and a reset release is done at a time t5.

When the power supply voltage VCC falls below the POR/LVD detection level at a time t6, the POR/LVD detection signal S1 is changed to a low level. Thus, the operation of the POR/LVD control circuit 11 is started so that the signal S5 is rendered high in level by the low level of the signal S2. Then, the signal S6 is brought to a high level in sync with the high level of the signal S5 so that the input mask of the mask circuit 14 is started. Consequently, the signal S8 is rendered low in level to enable the output operation of the input/output buffer 4. Thus, the system reset signal S9 is rendered low in level to carry out reset instructions to the inside. At a time t6, the signal S7 is brought to a reset instruction level corresponding to a low level in wait for its subsequent time t7 by the operation of the delay 20. Thus, since the input mask has already been done when reset instructions are given to the outside from the external terminal RESION by the signal S7, the low level of the signal S7 for the reset instructions to the outside inflows into the terminal reset control circuit 15 so that the POR/LVD control circuit 11 is undesirably initialized in mid course. Thus, the undesired high-level inversion of the signal S7 by the initialization of the signal S2 to the high level is suppressed.

Thereafter, when the power supply voltage VCC is restored to the POR/LVD detection level at a time t8, the POR/LVD factor reset signal S2 is changed to a high level after a reset hold period (time t9). During this period, the signal S6 is rendered high in level so that the input mask is done by the mask circuit 14. The signal S8 is rendered low in level so that the output of the input/output buffer 4 is enabled, and the signal S7 is rendered low in level to provide reset instructions to the outside from the external terminal RESION. Since, at a time t9, the signals S5, S7 and S9 are level-inverted, but the levels of the signals S6 and S8 are maintained, the input mask is maintained up to a timing (time t10) after the reset instructions to the outside from the external terminal RESION, and the low level of the signal S7 inflows into the terminal reset control circuit 15 until the reset instructions to the outside are normally released by the signal S7, whereby the POR/LVD control circuit 11 is undesirably initialized in mid course so that the signal S2 is initialized to a high level. As a result, the signal S7 is suppressed from being inverted to a high level at a fast timing. Accordingly, the reset of a device operated in response to the reset signal supplied to the outside from the external terminal RESION is properly conducted, thereby making it possible to prevent in advance a malfunction and a runaway of an external system after power-on reset.

Figure 4:
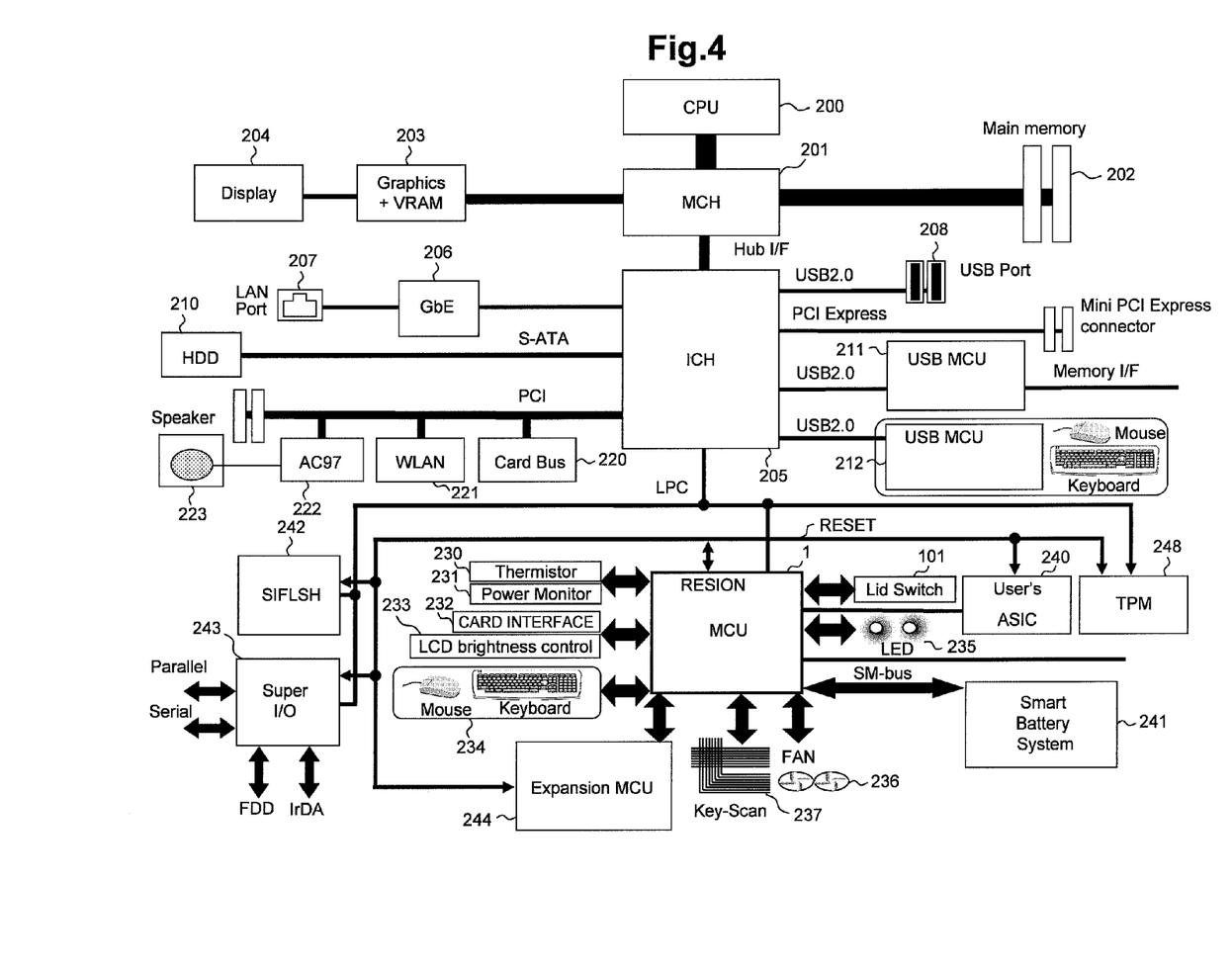
FIG. 4 is a block diagram of a note PC illustrated as one example of a data processing system to which the data processor according to the first embodiment of the present invention is applied.

A schematic configuration of a note PC which adopts the data processor 1 described in the above embodiment as a keyboard and a controller for power supply control, is illustrated in FIG. 4.

In the node PC used as a data processing system, the data processor 1 executes a program downloaded from a serial flash memory 242 to thereby control input devices coupled to the outside. Coupled to the data processor 1 as input/output devices are an LED indicator 235, a lid switch 101, a battery system 241, a cooling fan 236, a key-scan circuit 237, a thermistor 230, a power monitor 231, a card interface 232, a display brightness control circuit 233, a pointing device 234 such as a mouse, and an expansion processor 244, etc. A security processing module (TPM) 248, a super I/O 243, an ASIC 240 inherent in a user, etc. are coupled to an LPC bus. The external reset terminal RESION is coupled to the security processing module 248, super I/O 243, ASIC 240, serial flash memory 242 and the like. The data processor 1 is capable of performing a power-on reset or a reset based on a reduction in power supply voltage on these through the external reset terminal RESION in accordance with a reset signal RESET. In brief, the data processor 1 also functions as a reset IC with respect to those external devices.

The data processor 1 is coupled to input/output controller hubs 205 and 201 via the LPC bus. For example, the input/output controller hub 205 configures a south bridge (ICH), and the input/output controller hub 201 configures a north bridge (MCH). A LAN port 207 which is to be coupled to the south bridge (ICH) 205 via a local area network controller 206, an HDD 210 having a serial ATA interface, a card bus 220, a wireless LAN 221, an amplifier 222 for driving a speaker 223, USB controllers 211 and 212, a USB port 208 and a PCI controller, etc. are coupled to the south bridge (ICH) 205. A graphics controller 203 which performs display control of a display 204 and so on, a main memory 202 and a main processor 200 are coupled to the north bridge (MCH) 201.

Although not illustrated in particular, the data processor 1 may give instructions of the power-on reset and the reset based on the reduction in the power supply voltage to high-order hierarchical devices such as the north bridge (MCH) 201, south bridge (ICH) 205 and main processor 200, etc., using a terminal other than the external terminal RESION, e.g., an output terminal at a suitable port. Such a reset signal may be generated based on a system reset signal S9 generated insides the data processor 1.

As described above, the data processor 1 is capable of outputting the reset signal generated by the POR/LVD detection circuit 3 to the outside while being shared with the input terminal RESION for the external reset signal and suppressing the inflow of the reset signal outputted to the outside into the input system of the reset signal from outside via the input/output buffer 4. Therefore, the data processor is able to realize the function of a power supply IC and contribute to a reduction in the area of a circuit board that configures the data processing system. Accordingly, the data processor 1 is suitable for application to a note PC or a portable terminal that needs space saving in particular.

Second Embodiment

Figure 5:
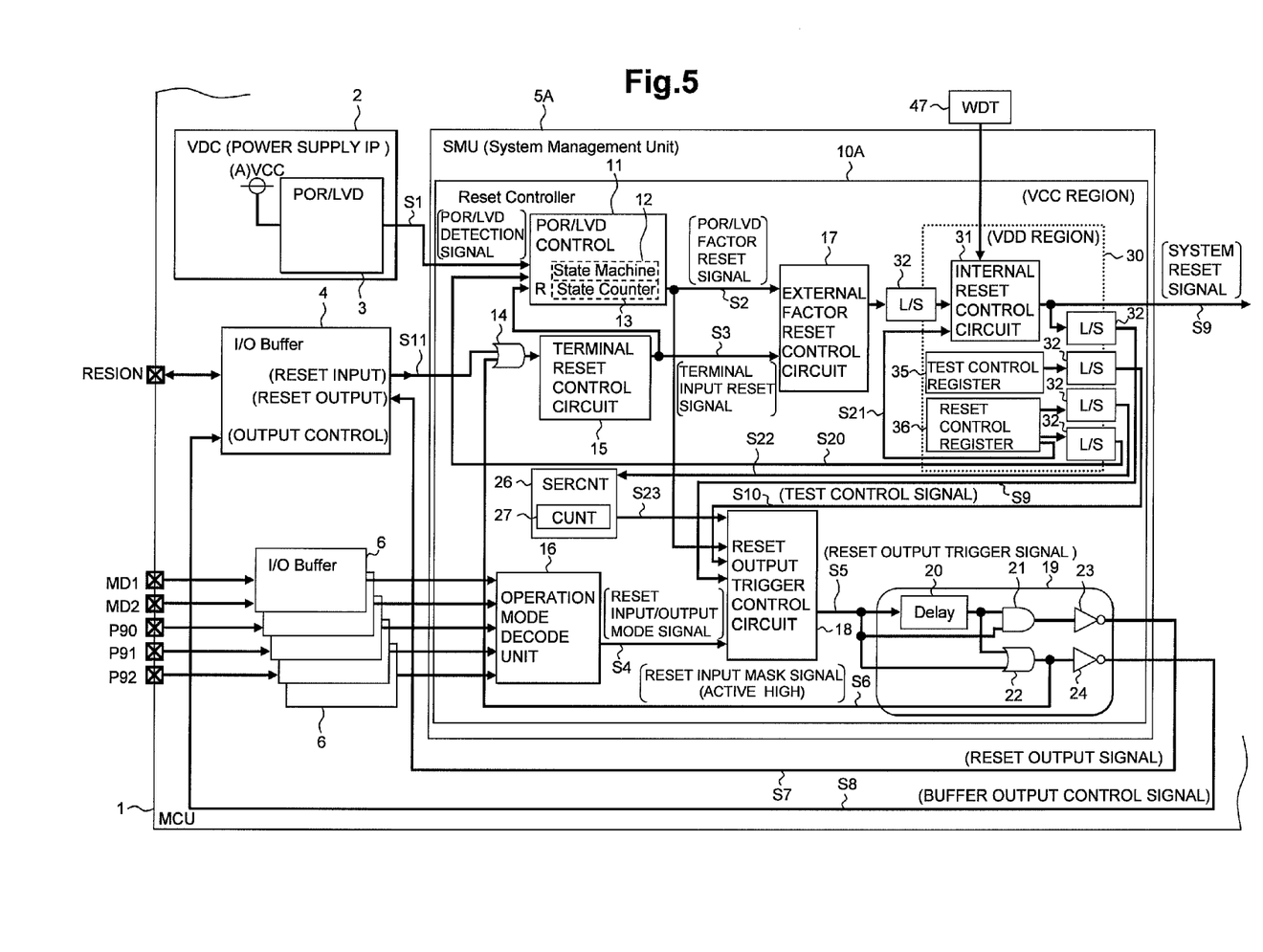
FIG. 5 is a block diagram showing another example of a reset controller.

Another example of a reset controller 10A is shown in FIG. 5. The reset controller 10A shown in the same figure is different from the reset controller 10 of FIG. 1 in that a software reset control function is added. The same reference numerals as those in FIG. 1 are respectively attached to other identical components, and their detailed description will be omitted. A description will be made below centering on the software reset function.

Figure 8:
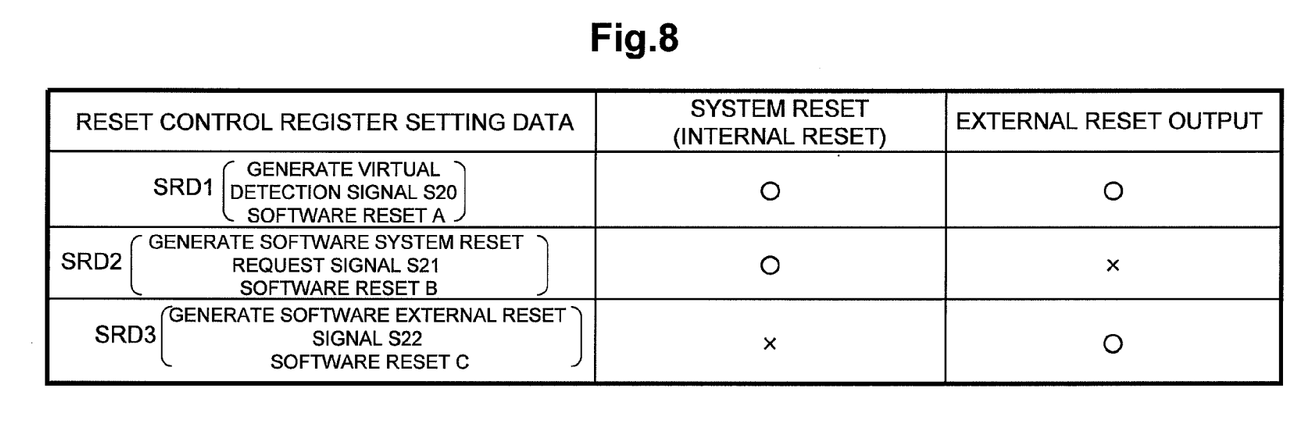
FIG. 8 is a mode diagram showing, in order, software reset functions designated according to data set by a reset control register.

A reset control register 36 capable of reading/writing by a CPU 40 corresponding to one internal circuit is provided to provide instructions for software reset. Write areas for first, second and third data are allocated to the reset control register 36. As illustrated even in FIG. 8, first data SRD1 is written to generate a virtual detection signal S20, thereby providing instructions for a software reset A. Second data SRD2 is written to generate a software system reset request signal S21, thereby providing instructions for a software reset B. Third data SRD3 is written to generate a software external reset signal S22, thereby providing instructions for a software reset C.

The POR/LVD control circuit 11 that inputs the virtual detection signal S20 therein recognizes the virtual detection signal S20 as a signal equivalent to the detection signal S1 from the detection circuit 2 and is operated in a manner similar to the case where the detection signal S1 is brought to the detection level. Consequently, the system reset signal S9 is generated and reset instructions are given to the outside from the external reset terminal RESION. Further, the output operation of the input/output buffer 4 is selected and the input from the input/output buffer 4 is masked during a period that contains a period from the reset instructions given to the outside to the reset release and is longer than this period.

Thus, a system reset caused by the detection signal S1 from the detection circuit 2, and reset control equivalent to an external reset control function can be carried out by the operation of writing the first data SRD1 into the software reset control register 36. Accordingly, when another module 43 corresponding to one internal circuit detects a malfunction such as an undesired rise in temperature of the microcomputer 1 or its external circuit, a system reset and external reset control similar to the case of the undesired reduction in the power supply voltage can be easily achieved using software.

The software system reset request signal S21 is supplied to the internal reset control circuit 31. When the software system reset request signal S21 is inputted, the internal reset control circuit 31 changes the system reset signal S9 from the reset instructions to the reset release in a manner similar to the system reset request signal or the like supplied from the WDT 47.

It is thus possible to arbitrarily perform the system reset using the software.

When a software external reset request signal S22 is supplied, a reset output controller (SERCNT) 26 for software external reset raises an output trigger signal S23 to a high level and starts counting of an internal counter (COUNT) 27, and allows a signal S23 to fall to a low level in sync with a count-up timing. The output trigger signal S23 generates a reset hold period in sync with the software external reset request signal S22. The reset output trigger control circuit 18 generates a reset output trigger signal S5 corresponding to the reset hold period of the output trigger signal S23. Consequently, reset instructions are given to the outside from the external reset terminal RESION, and the output operation of the input/output buffer 4 is selected and the input from the input/output buffer 4 is masked during a period that contains a period from the reset instructions given to the outside to the reset release and is longer than this period.

Thus, only the reset control equivalent to an external reset control function caused by the detection signal from the detection circuit 2 can be easily achieved using software.

Figure 6:
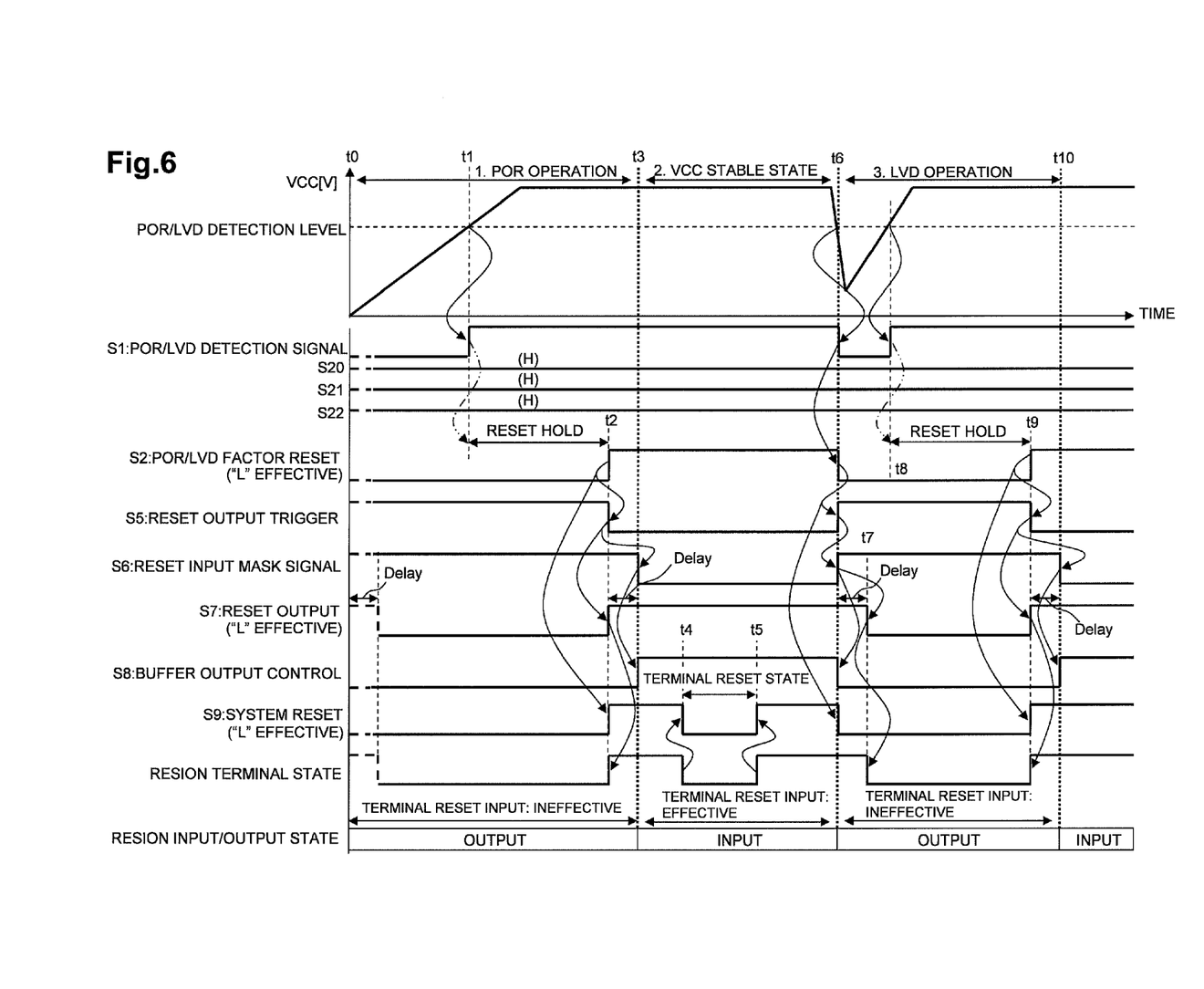
FIG. 6 is a timing chart illustrating the operation of generating a reset signal in a power supply unstable state by the reset controller shown in FIG. 5.

The operation of generating a reset signal by the reset controller 10A of FIG. 5 is illustrated by an example in FIG. 6. In FIG. 6, the signals S20, S21 and S22 for software reset are respectively negated to a high level. FIG. 6 shows timings similar to FIG. 2.

Figure 7:
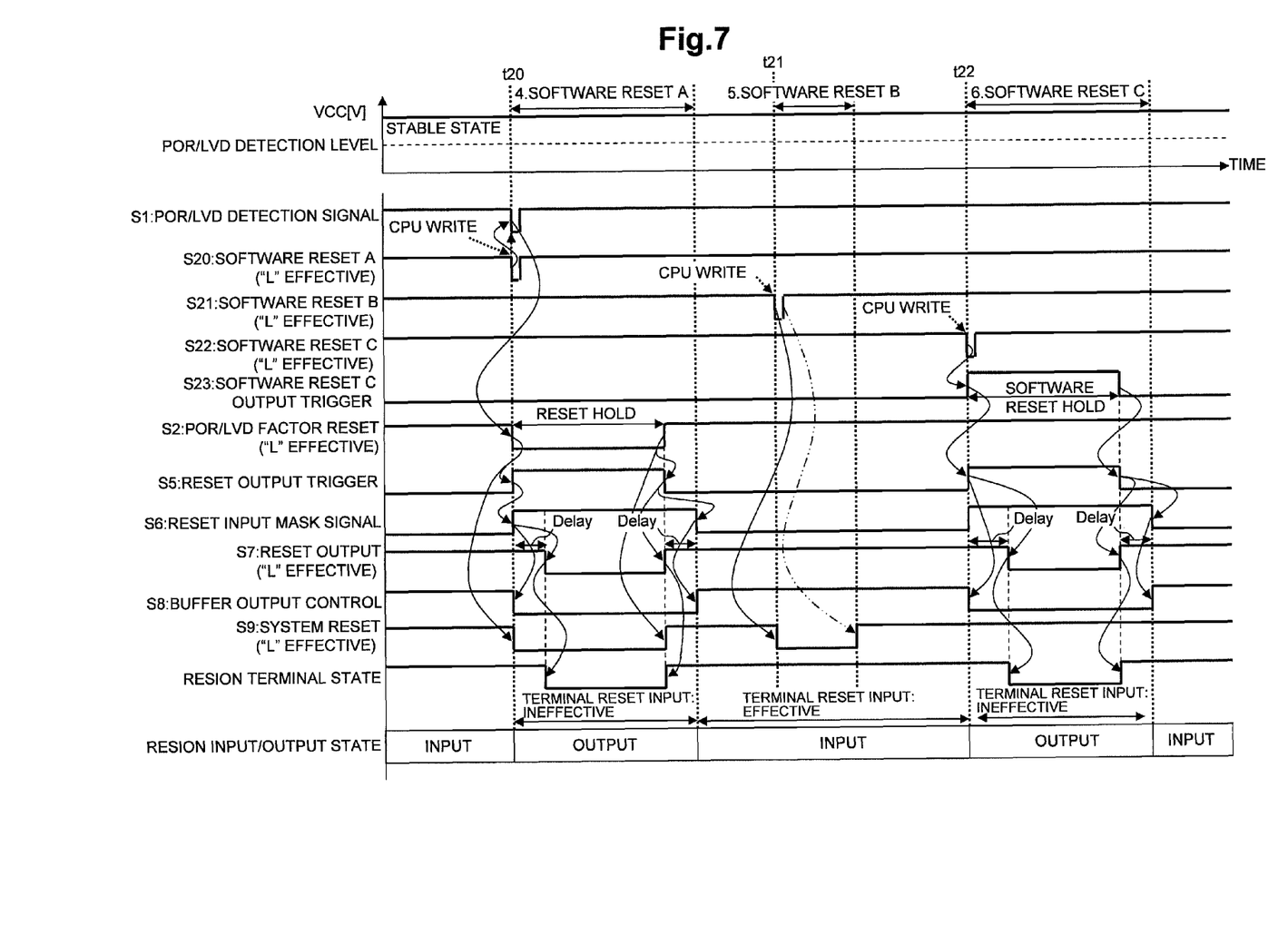
FIG. 7 is a timing chart illustrating each operation taken when a software reset is required in a state in which a power supply voltage is stable.

Operation timings taken when the software reset is required in a state in which a power supply voltage is stable, are illustrated by an example in FIG. 7.

At a time t20, the first data SRD1 is written into the reset control register 36 to require a software reset A, whereby the same operation timings as from the times t6 to t10 in FIG. 6 are generated. Thus, the low level of the signal S7 inflows into the terminal reset control circuit 15 until the reset instructions to the outside are normally released by the signal S7, whereby the POR/LVD control circuit 11 is undesirably initialized in mid course, so that the signal S2 is initialized to a high level. As a result, the signal S7 is suppressed from being inverted to a high level at a fast timing. Accordingly, the reset of a device operated in response to the reset signal supplied to the outside from the external terminal RESION is properly conducted, thereby making it possible to prevent in advance a malfunction and a runaway of an external system after power-on reset.

At a time t21, the second data SRD2 is written into the reset control register 36 so that a software reset B is required. Thus, the system reset signal S9 is rendered low in level for a predetermined period, whereby the system reset is conducted.

At a time t22, the third data SRD3 is written into the reset control register 36 to require a software reset C. Thus, an output trigger signal S23 for the software reset C is held at a high level for a predetermined period. An external reset signal is outputted from the external terminal RESION such that this period is brought to a reset hold period. A reset function by the software reset C is different from that by the software reset A in that the system reset signal S9 remains negated to a high level.

While the invention made above by the present inventors has been described specifically on the basis of the embodiments, the present invention is not limited to the embodiments referred to above. It is needless to say that various changes can be made thereto within the scope not departing from the gist thereof.

For example, the concrete logic configuration of the reset controller is not limited to the above embodiments, but may be modified as appropriate. The data processing system is not limited to the note PC, but may widely be applied to other mobile products or the like. The circuit modules included in the data processor are not limited to those in FIG. 3, but may be modified as appropriate.

What is claimed is:

1. A data processor comprising:
an external reset terminal used for outputting a system reset signal to outside of the data processor and for receiving an external reset signal from outside of the data processor;
an input/output buffer coupled to the external reset terminal,
wherein the input/output buffer is able to output the system reset signal to outside of the data processor through the external reset terminal, and is able to receive the external reset signal from outside of the data processor through the external reset terminal and generate an internal received reset signal;
a detection circuit which detects respective reset factors including a first reset factor due to turn-on of a power supply and a second reset factor due to a voltage drop of the power supply, and generates a detection signal;
a reset controller which generates the system reset signal, based on the detection signal from the detection circuit and the internal received reset signal generated by the input/output buffer, and, when the system reset signal generated based on the detection signal from the detection circuit is output to the outside of the data processor through the input/output buffer and the external reset terminal, enables the input/output buffer to output the system reset signal and masks the internal received reset signal generated by the input/output buffer during a first period which includes and is longer that a second period from the time of asserting the system reset signal to the time of releasing the system reset signal; and
internal circuit modules each initialized based on the system reset signal.

2. The data processor according to claim 1,
wherein the reset controller disables the input/output buffer output of the system reset signal and stops masking the internal received reset signal at a timing delayed from the time of releasing the system reset signal after an elapse of a reset hold period when the reset factor due to the turn-on of the power supply is detected, and generates the system reset signal synchronized with the internal received reset signal inputted from the external reset terminal during a period that none of the reset factors are detected after the time of releasing the system reset signal generated based on the reset factor due to the turn-on of the power supply, and
wherein the reset controller enables the input/output buffer to output the system reset signal and masks the internal received reset signal generated by the input/output buffer when the reset factor due to the voltage drop of the power supply is detected after the time of releasing the system reset signal generated based on the reset factor due to the turn-on of the power supply and then the reset controller asserts the system reset signal and after an elapse of a reset hold period releases the system reset signal being output through the external reset terminal, and then disables the input/output buffer output of the system reset signal and stops masking the internal received reset signal.

3. The data processor according to claim 2,
wherein the reset controller generates a reset signal output to the outside of the data processor from the external reset terminal based on the system reset signal,
wherein the reset controller asserts the reset signal at a timing delayed from asserting the reset by the system reset signal, and releases the reset signal at the same timing as releasing the system reset signal.

4. The data processor according to claim 1, further comprising mode terminals,
wherein when a first operation mode is instructed from the corresponding mode terminal, the reset controller shares the external reset terminal for the external output of the system reset signal and the input of the external reset signal from outside, and
wherein when a second operation mode is instructed from the corresponding mode terminal, the reset controller uses the external reset terminal specifically for the input of the external reset signal from outside.

5. The data processor according to claim 1,
wherein the reset controller comprises:
a first control circuit which activates a first signal in response to the detection of the reset factor from the detection circuit and generates a timing provided to inactivate the first signal as a reset release timing;
a mask gate circuit which selectively masks an activated second signal inputted from the input/output buffer;
a second control circuit which initializes the first control circuit in response to the activation of the second signal from the mask gate circuit and transfers the activated second signal to a subsequent stage as an external reset instruction signal;
a first signal generator which generates the system reset signal, based on the first signal, the second signal transferred via the second control circuit and signals related to other reset factors; and
a second signal generator which generates a mask control signal for masking the mask gate circuit in response to the activation of the first signal and releasing the mask of the mask gate circuit by responding to the inactivation of the first signal with a delay, generates a buffer control signal for selecting the output operation of the input/output buffer during a mask period by the mask control signal, responds to a mask setting based on the mask control signal with a delay to thereby give reset instructions by the system reset signal as an output signal of the input/output buffer, and performs a mask release of the mask control signal after a reset release by the system reset signal has been given as the output signal of the input/output buffer.

6. The data processor according to claim 5, further comprising mode terminals,
wherein when a first operation mode is instructed from the corresponding mode terminal, the second signal generator shares the external reset terminal for the external output of the system reset signal and the input of the external reset signal from outside, and
wherein when a second operation mode is instructed from the corresponding mode terminal, the second signal generator uses the external reset terminal specifically for the input of the external reset signal from outside.

7. The data processor according to claim 5, further comprising a test control register which generates a test signal virtually assumed to be the first signal for the second signal generator.

8. The data processor according to claim 1,
wherein the reset controller comprises a software reset control register accessible by the internal circuits,
wherein when first data is written into the software reset control register, the reset controller generates a virtual detection signal equivalent to the detection signal from the detection circuit to thereby generate the system reset signal and output the system reset signal to the outside through the external reset terminal and to enable the input/output buffer to output the system reset signal and mask the internal received reset signal generated by the input/output buffer during a first period which is longer than and includes a second period from the time of asserting the system reset signal to the time of releasing the system reset signal.

9. The data processor according to claim 1,
wherein the reset controller comprises a software reset control register accessible by the internal circuits,
wherein when second data is written into the software reset control register, the reset controller generates a software system reset request signal to thereby change the system reset signal from the reset instructions to the reset release.

10. The data processor according to claim 1,
wherein the reset controller comprises a software reset control register accessible by the internal circuits,
wherein when third data is written into the software reset control register, the reset controller generates a software external reset request signal to thereby give reset instructions to the outside through the external reset terminal and to enable output of the input/output buffer and mask the input from the input/output buffer during the first period.

11. A data processing system comprising:
a data processor which controls input/output devices coupled to the outside of the data processing system;
input/output controller hubs coupled to the data processor; and
a main processor coupled to the input/output controller hubs by a system bus,
wherein the data processor comprises:
an external reset terminal used for outputting a system reset signal to outside of the data processor and for receiving an external reset signal from outside of the data processor;
an input/output buffer coupled to the external reset terminal,
wherein the input/output buffer is able to output the system reset signal to outside of the data processor through the external reset terminal, and is able to receive the external reset signal from outside of the data processor through the external reset terminal and generate an internal received reset signal;
a detection circuit which detects respective reset factors including a first reset factor due to turn-on of a power supply and a second reset factor due to a voltage drop of the power supply, and generates a detection signal;
a reset controller which generates the system reset signal, based on the detection signal from the detection circuit and the internal received reset signal generated by the input/output buffer, and, when the system reset signal generated based on the detection signal from the detection circuit is output to the outside of the data processor through the input/output buffer and the external reset terminal, enables the input/output buffer to output the system reset signal and masks the internal received reset signal generated by the input/output buffer during a first period which includes and is longer than a second period from the time of asserting the system reset signal to the time of releasing the system reset signal; and
internal circuit modules each initialized based on the system reset signal.

12. The data processing system according to claim 11,
wherein each of the input/output devices is initialized by inputting a reset signal outputted from the external reset terminal of the data processor.

13. The data processing system according to claim 12, wherein the data processor outputs a signal generated based on the system reset signal to the input/output controller hubs as the reset signal.

14. The data processing system according to claim 12, wherein the input/output devices and the input/output controller hubs are coupled to the data processor via an LPC bus.

15. The data processing system according to claim 11, wherein the reset controller disables the input/output buffer output of the system reset signal and stops masking the internal received reset signal at a timing delayed from the time of releasing the system reset signal after an elapse of a reset hold period when the reset factor due to the turn-on of the power supply is detected,
wherein the reset controller generates the system reset signal synchronized with the internal received reset signal inputted from the external reset terminal during a period that none of the reset factors are detected after the time of releasing the system reset signal generated based on the reset factor due to the turn-on of the power supply, masks the internal received reset signal generated by the input/output buffer and enables the input/output buffer to output the system reset signal when the reset factor due to the voltage drop of the power supply after a release of the system reset signal based on the reset factor due to the turn-on of the power supply is detected and then outputs the system reset signal based on the reset factor due in the voltage drop of the power supply to the outside of the data processor from the external reset terminal, and
wherein the reset controller performs control for disabling the input/output buffer output of the system reset signal and stops masking the internal received reset signal at a timing delayed from the time of releasing the system reset signal after an elapse of a reset hold period.

16. The data processing system according to claim 15, wherein the reset controller generates a reset signal output to the outside of the data processor from the external reset terminal based on the system reset signal,
wherein the reset controller asserts the reset signal at a timing delayed from asserting the reset by the system reset signal, and releases the reset signal at the same timing as releasing the system reset signal.

17. The data processing system according to claim 11, wherein the reset controller comprises:
a first control circuit which activates a first signal in response to the detection of the reset factor from the detection circuit and generates a timing provided to inactivate the first signal as a reset release timing;
a mask gate circuit which selectively masks an activated second signal inputted from the input/output buffer;
a second control circuit which initializes the first control circuit in response to the activation of the second signal from the mask gate circuit and transfers the activated second signal to a subsequent stage as an external reset instruction signal;
a first signal generator which generates the system reset signal, based on the first signal, the second signal transferred via the second control circuit and signals related to other reset factors; and
a second signal generator which generates a mask control signal for masking the mask gate circuit in response to the activation of the first signal and releasing the mask of the mask gate circuit by responding to the inactivation of the first signal with a delay, generates a buffer control signal for selecting the output operation of the input/output buffer during a mask period by the mask control signal, gives reset instructions by the system reset signal as an output signal of the input/output buffer by responding to a mask setting based on the mask control signal with a delay, and performs a mask release of the mask control signal after a reset release by the system reset signal has been given as the output signal of the input/output buffer.

18. The data processing system according to claim 17, further comprising mode terminals,
wherein when a first operation mode is instructed from the corresponding mode terminal, the second signal generator shares the external reset terminal for the external output of the system reset signal and the input of the external reset signal from outside, and
wherein when a second operation mode is instructed from the corresponding mode terminal, the second signal generator uses the external reset terminal specifically for the input of the external reset signal from outside.

* * * * *